US010507825B2

(12) United States Patent
Gangwar et al.

(10) Patent No.: US 10,507,825 B2
(45) Date of Patent: Dec. 17, 2019

(54) VEHICLE PITCH CONTROL DURING A STOP (71) Applicant: Ford Global Technologies, LLC, Dearborn, MI (US)

(72) Inventors: Hans Gangwar, Livonia, MI (US); Zachary Konchan, Westland, MI (US); Alexander Mccollough, Northville, MI (US); Leonard Eber Carrier, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 278 days.

(21) Appl. No.: 15/346,337

(22) Filed: Nov. 8, 2016

(65) Prior Publication Data

US 2018/0126981 A1 May 10, 2018

(51) Int. Cl.
G06F 19/00 (2018.01)
B60W 30/02 (2012.01)
B60W 10/06 (2006.01)
B60W 10/08 (2006.01)
B60W 10/184 (2012.01)
B60W 30/18 (2012.01)
B60W 50/14 (2012.01)
G05D 1/08 (2006.01)

(52) U.S. Cl.
CPC .......... B60W 30/02 (2013.01); B60W 10/06 (2013.01); B60W 10/08 (2013.01); B60W 10/184 (2013.01); B60W 30/18109 (2013.01); B60W 50/14 (2013.01); G05D 1/0891 (2013.01); B60W 2050/146 (2013.01); B60W 2420/42 (2013.01); B60W 2420/52 (2013.01); B60W 2520/16 (2013.01); B60W 2710/0666 (2013.01); B60W 2710/083 (2013.01); B60W 2710/182 (2013.01); G05D 2201/0213 (2013.01)

(58) Field of Classification Search
CPC ...... B60W 30/02; B60W 10/06; B60W 10/08; B60W 10/184; B60W 30/18109; B60W 50/14; B60W 2050/146; B60W 2420/42; B60W 2420/52; B60W 2520/16; B60W 2710/0666; B60W 2710/083; B60W 2710/182; G05D 1/0891; G05D 2201/0213
USPC ...................................................... 701/1, 22
See application file for complete search history.

(56) References Cited

U.S. PATENT DOCUMENTS 8,229,642 B2 7/2012 Post, II
8,862,300 B2 10/2014 Ichinose
8,880,293 B2 11/2014 Hirao
(Continued)

FOREIGN PATENT DOCUMENTS

EP 0417792 B1 3/1997
JP 2009018606 1/2009
WO WO-2015098217 A1 7/2015

Primary Examiner — Ronnie M Mancho
(74) Attorney, Agent, or Firm — David R. Stevens; Stevens Law Group (57) ABSTRACT A system for vehicle pitch control during braking includes a pitch component and a rebound component. The pitch component is configured to determine that a vehicle has a forward pitch during braking. The rebound component is configured to, in response to the vehicle achieving a substantially zero forward velocity, apply brake pressure to one or more non-driven wheels using one or more brakes and apply reverse torque to one or more driven wheels using a motor or engine.

20 Claims, 7 Drawing Sheets (56) References Cited

U.S. PATENT DOCUMENTS

| | | | |
|---|---|---|---|
| 8,948,969 B2 | 2/2015 | Hrovat | |
| 9,187,090 B2 | 11/2015 | Shiozawa | |
| 2002/0035423 A1* | 3/2002 | Shank | B60G 17/0185 |
| | | | 701/37 |
| 2005/0049761 A1* | 3/2005 | Kataoka | B60G 17/016 |
| | | | 701/1 |
| 2009/0024277 A1* | 1/2009 | Poilbout | B60G 3/04 |
| | | | 701/38 |
| 2014/0260233 A1* | 9/2014 | Giovanardi | F15B 13/0444 |
| | | | 60/431 |
| 2014/0288776 A1* | 9/2014 | Anderson | B60G 17/016 |
| | | | 701/37 |
| 2014/0316652 A1* | 10/2014 | Ericksen | F16F 9/512 |
| | | | 701/37 |
| 2015/0224845 A1* | 8/2015 | Anderson | B60G 17/019 |
| | | | 701/37 |

* cited by examiner

VEHICLE PITCH CONTROL DURING A STOP

TECHNICAL FIELD

The present disclosure relates to vehicle pitch control during a stop and more particularly relates mitigating end-of-stop rebound discomfort.

BACKGROUND

Automobiles provide a significant portion of transportation for commercial, government, and private entities. Autonomous vehicles and driving assistance systems are currently being developed and deployed to provide safety features, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive, navigate, and/or park a vehicle with little or no user input. Because vehicles often carry people or other cargo, it is of importance to provide a smooth ride for passenger comfort and cargo safety.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

End-of-stop suspension rebound (which is also known as head bob, head nod, or end-of-stop grab) can lead to discomfort or otherwise be objectionable in relation to passengers or cargo. End-of-stop suspension rebound may result when a braking vehicle transitions to a standstill with a wound up suspension. For example, during a deceleration a vehicle may be tilted forward (e.g., in a nosedive), which, when the vehicle is brought to a stop, may result in suspension rebound, thereby causing the driver and passengers to experience a backwards pitch force. The rebound may occur because the front suspension rebounds too quickly and/or is insufficiently damped. The effect of this rebound is a sudden release in forward momentum and/or front-loading of the vehicle.

Applicants have recognized and developed systems, methods, and devices to reduce the rebound rate and avoid the accompanying jerk or discomfort which may occur. According to one embodiment, system for reducing end-of-stop rebound includes a pitch component and a rebound component. The pitch component is configured to determine that a vehicle has a forward pitch during braking. The rebound component configured to reduce how quickly the front suspension rebounds in response to the vehicle achieving a substantially zero forward velocity. The rebound component applies brake pressure to one or more non-driven wheels using one or more brakes and applies reverse torque to one or more driven wheels using a motor.

Braking one or more wheels (such as the rear wheels) while applying reverse torque to one or more drive wheels (such as a front wheel) results in a downward force to the front suspension. This can maintain a downward force on the front suspension to limit how quickly the front suspension rebounds. For example, when a vehicle comes to a stop, the suspension front springs wind up (or compress). Brake pressure may be applied to a non-driven axle (using hydraulic pressure of a service brake or using electric park brake). Powertrain torque can also be quickly ramped up in reverse to create a moment on the car, pushing suspension down on front wheels. Thus, the powertrain torque may cancel out at least some suspension rebound. It will be noted that engine or motor powertrain torque may only act on the driven axle. This generates a backwards force below the center of gravity, and the resultant center of gravity torque twists towards a negative pitch angle (nosedive). This resulting torque twists toward a negative pitch angle regardless of whether it is a front or rear wheel drive vehicle. Specifically, even on a rear wheel drive vehicle where the rear wheels receive reverse torque and the front wheels are braked, the resultant force always acts in negative x direction. The torque may be slowly ramped out (e.g., reduced) to allow the vehicle to return to a zero pitch angle (e.g., horizontal or parallel to the road). In one embodiment, a continuously controlled damping (CCD) may be used to prevent/limit suspension windup and/or release. However, if the suspension is not successful in preventing or limiting suspension windup, the reverse torque combined with braking may stop the rebound.

In one embodiment, a system may provide feedback control (closed loop) based on vehicle pitch. The vehicle pitch angle may be calculated using a pitch sensor, which may be included within a restraint control module (RCM) where yaw and long acceleration sensors are located. In other embodiments, a physical sensor is not required. Such a case is where the pitch angle may be inferred based on information from tire pressure sensors. For example, the pitch angle may be calculated based on pressure changes for front or rear tires indicating front loading. Another such case is where pitch angle is inferred from a vehicle's speed, longitudinal deceleration, yaw, as well as associated torques.

As a further extension, pitch angle can be calculated and used in a variety of vehicle models, not limited to the parameters described above.

The systems, methods, and devices for reducing end-of-stop rebound rate provide significant benefits. Specifically, the methods and systems disclosed herein do not sacrifice braking distance. For example, a deceleration rate is maintained for a given pedal position and does not require lowering deceleration rate to mitigate end of stop grab. Other strategies change the deceleration rate and can result in a longer braking distance, which is a safety concern. The methods and systems improve customer satisfaction by reducing end of stop grab and can be implemented in many already manufactured vehicles. For example, algorithms presented for pitch calculation, reverse torque, and braking may be applied in many existing vehicles simply by updating software or algorithms in a controller of a vehicle.

Further embodiments and examples will be discussed in relation to the figures below.

Figure 1:
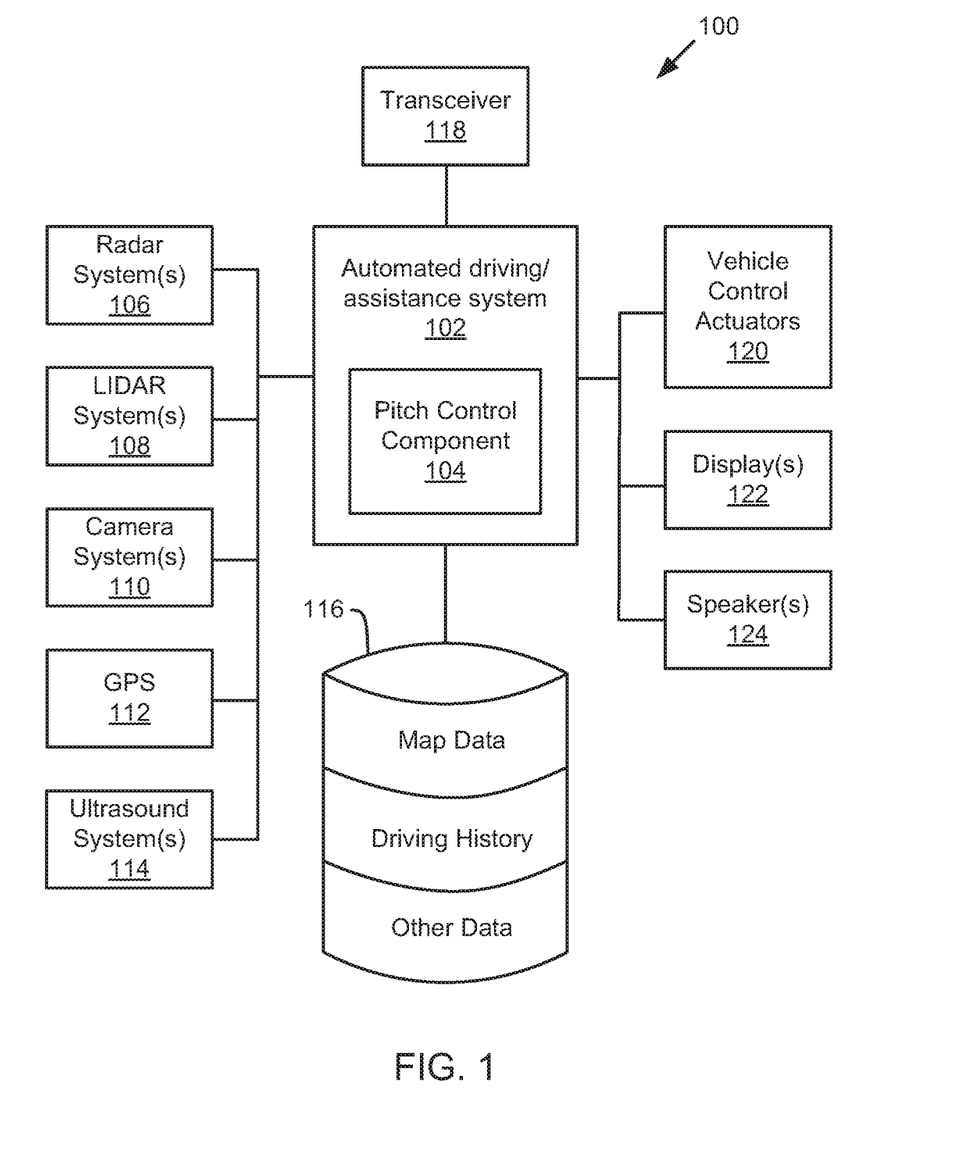
FIG. 1 is a schematic block diagram illustrating an implementation of a vehicle control system that includes an automated driving/assistance system, according to one embodiment.

Referring now to the figures, FIG. 1 illustrates an example vehicle control system 100. The vehicle control system 100 includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, suspension damping, or any other driving or auxiliary systems of the vehicle. In another example, the automated driving/assistance system 102 may not be able to provide any control of the driving (e.g., steering, acceleration, or braking), but may provide notifications and alerts to assist a human driver in driving safely. For example, the automated driving/assistance system 102 may include one or more controllers (such as those discussed herein) that provide or receive data over a controller bus and use the data to determine actions to be performed and/or provide instructions or signals to initiate those actions.

The automated driving/assistance system 102 may include a pitch control component 104 to mitigate end of stop grab. The pitch control component 104 prevents resulting suspension rebound at the end of stop by applying brake pressure to the non-driven axle and ramping powertrain torque up in reverse. Reverse torque creates a moment on the vehicle which pushes the suspension down on the front wheels and cancels suspension rebound. Engine powertrain torque is only acting on the driven axle. The resultant center of gravity (CG) torque twists towards a negative pitch angle (nosedive). If continuously controlled damping (CCD) suspension did not prevent windup, the pitch control component 104 may hold the negative pitch angle and slowly ramp out (i.e., reduce) the torque so the pitch angle returns to zero. The pitch control component 104 can also command CCD suspension to prevent wind up to suppress reaction. The pitch control component 104 calculates the pitch of the vehicle using an algorithm. The pitch control component 104 may use a feedback/closed loop algorithm and is based on a vehicle pitch position provided by an actual pitch sensor, inferred pitch from tire pressure sensor, and/or speed/deceleration feedback calibrated for the pitch angle.

The vehicle control system 100 also includes one or more sensor systems/devices for detecting a presence of nearby objects, lane markers, bumps, road texture, and/or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or ultrasound systems 114. The vehicle control system 100 may include a data store 116 for storing relevant or useful data such as vehicle information (model information or vehicle performance characteristics), map data, a driving history (i.e., drive history), or other data. The vehicle control system 100 may also include a transceiver 118 for wireless communication with a mobile or wireless network, other vehicles, infrastructure, cloud or remote computing or storage resources, or any other communication system.

The vehicle control system 100 may include vehicle control actuators 120 to control various aspects of the driving of the vehicle such as electric motors, switches or other actuators, to control braking, acceleration, steering, suspension damping, or the like. For example, the vehicle control actuators 120 may include semi-active dampers or shock absorbers on each wheel that can be controlled with a current or electrical signal. The vehicle control system 100 may include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

In one embodiment, the automated driving/assistance system 102 only provides assistance and vehicle control during driving by a human driver. For example, the automated driving/assistance system 102 may adjust suspension for a ride or improve ride comfort while a vehicle accelerates, brakes, or steers. In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. In one embodiment, the automated driving/assistance system 102 also uses information stored in a driving history (locally or remotely) for determining conditions in a current environment. The automated driving/assistance system 102 may implement one or more algorithms, applications, programs, or functionality that drive or assist in driving of the vehicle.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2A:
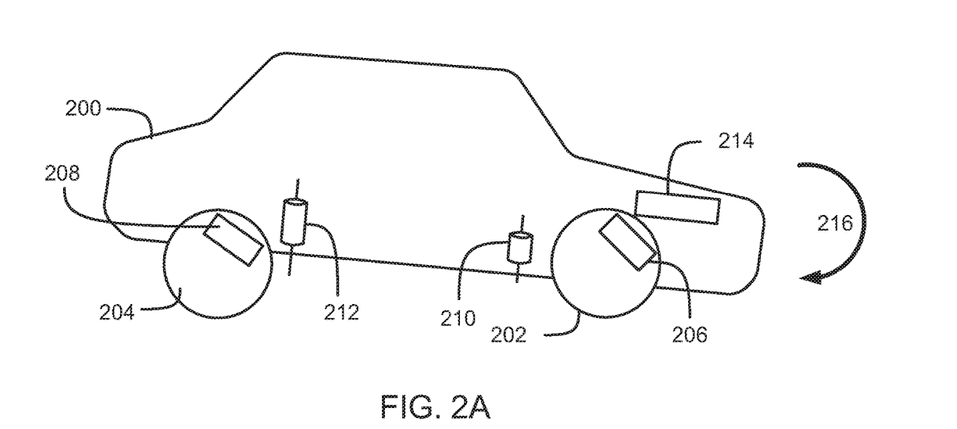
FIG. 2A is a perspective side-view illustrating a vehicle with forward tilt during or at a stop.
Figure 2B:
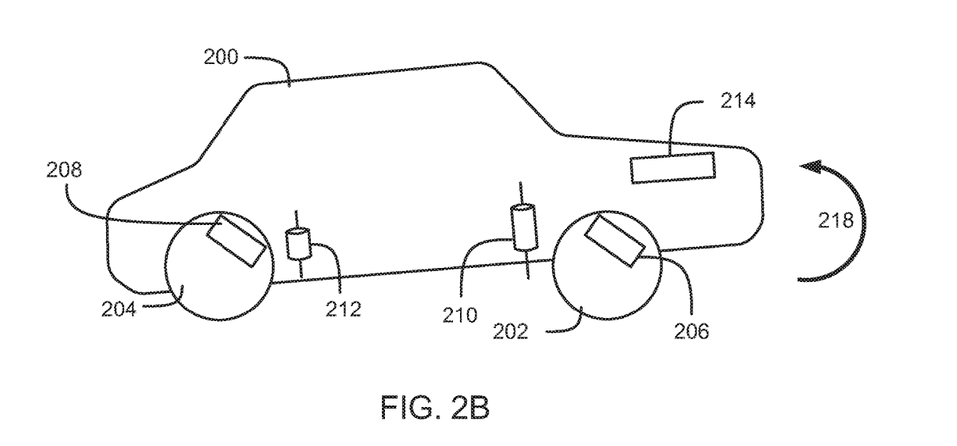
FIG. 2B is a perspective side-view illustrating a vehicle rebounding from a forward tilt after a stop.

FIG. 2A and 2B illustrate suspension rebound after a stop. FIG. 2A illustrates a vehicle braking and/or at a stop. The vehicle includes front wheels 202, rear wheels 204, front brakes 206, rear brakes 208, front suspension 210, rear suspension 212, and an engine/motor 214. During or even briefly after a stop, the vehicle may tip forward due to front loading to cause the front suspension 210 be loaded (front suspension line up) as indicated by line 216. If insufficiently damped or otherwise mitigated, the front suspension 210 may unwind (extend) and cause the vehicle to quickly transition from a forward pitch up and may even pitch backwards. FIG. 2B illustrates the vehicle 200 following a stop as the front suspension 210 rebounds, causing the vehicle 200 to pitch upward and/or backwards. Following the stop, the front end of the vehicle 200 may pitch upward causing the vehicle to tilt backward as indicated by line 218. Even minor rebound can cause discomfort to passengers or cause cargo to be displaced.

Figure 3A:
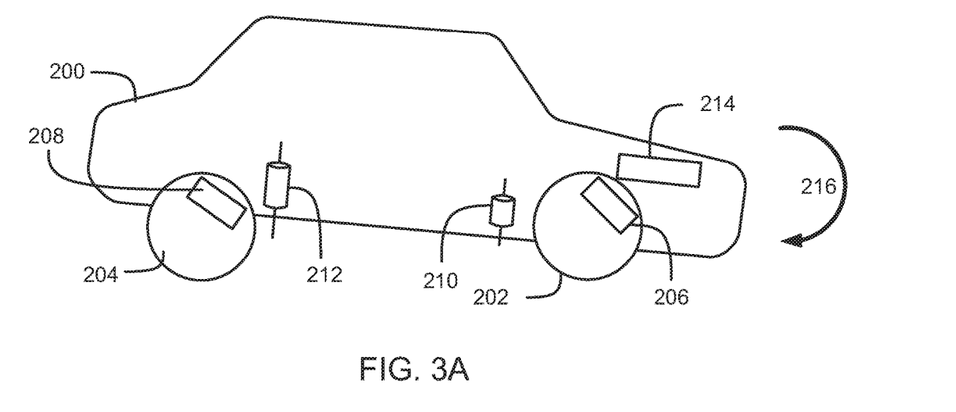
FIG. 3A is a perspective side-view illustrating a vehicle with forward tilt during a stop or upon stopping.
Figure 3B:
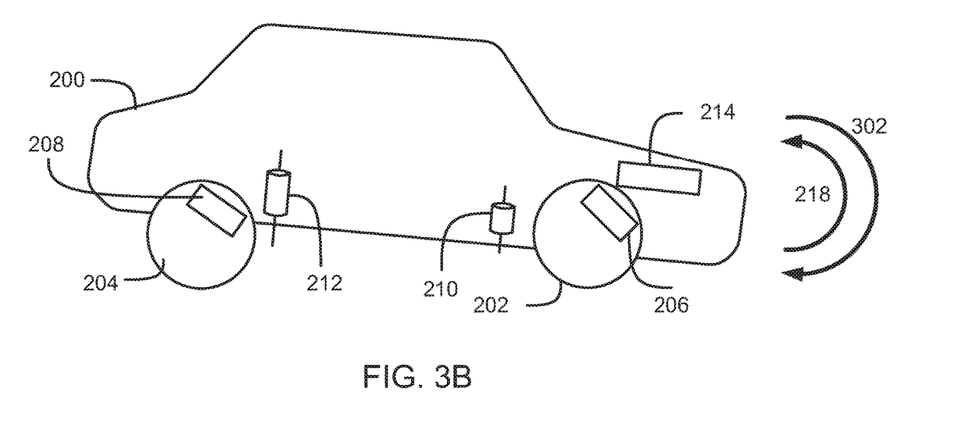
FIG. 3B is a perspective side-view illustrating rebound mitigation after a stop, according to one embodiment.

FIG. 3A and 3B illustrate after stop rebound mitigation, according to one embodiment. For example, the rebound may be mitigated or slowed using reverse torque applied to the front wheels with brake pressure applied to the rear wheels 204. FIG. 3A illustrates the vehicle 200 upon stopping with the front suspension 210 compressed. FIG. 3A illustrates the vehicle 200 after the stop with the front suspension 210 still compressed. After the stop, the front suspension 210 attempts to rebound as indicated by line 218. However, torque from the engine/motor 214 to the front wheels 202 induces a powertrain moment (line 302) which counteracts the suspension rebound 218. For example, torque from the engine/motor 214 applied to the wheel causes a downward force 302 to oppose the suspension rebound 218 and brake pressure applied to the rear wheels 204 keeps the vehicle 200 in place. Braking may be provided using an emergency brake (such as a parking brake or hand brake) or a service brake. A service brake may include the stopping brakes used by a driver or control system to slow or stop a driving vehicle (such as disc brakes or drum brakes at each wheel). Reverse torque may be slowly released or reduced to allow the front suspension 210 to return slowly and smoothly to its natural state.

Torque may be applied to either the front wheels 202 or rear wheels 204. For example, in a front wheel drive vehicle reverse torque is applied to the front wheels 202 and braking is applied to the rear wheels 204. As another example, in a rear wheel drive vehicle the reverse torque is applied to the rear wheels 204 while the braking is applied to the front wheels 202. In one embodiment, the braking may occur on the non-driven wheels even if a driver releases a brake pedal. This may allow rebound mitigation to be performed automatically without requiring user input or control. Of course, if a user presses the gas pedal during this time, the braking of non-driven wheels and/or reverse torque applied to driven wheels may be terminated and a correct amount and direction of torque may be applied to the drive wheels as directed by the user.

In one embodiment, the amount of torque applied to the front wheels may be based on a current pitch angle of the vehicle. The pitch angle may be determined directly based on pitch sensors or may be determined indirectly based on deflection for the rear and front suspension. In one embodiment, the pitch angle may be determined based on the speed, current deceleration rate, and or specific characteristics of the vehicle. For example, information about vehicle weight, center of gravity, distance between the center of gravity and a front or rear axle, vehicle height, or other details about the vehicle may be used to estimate the current pitch of the vehicle given only the speed and/or deceleration rate.

Figure 4:
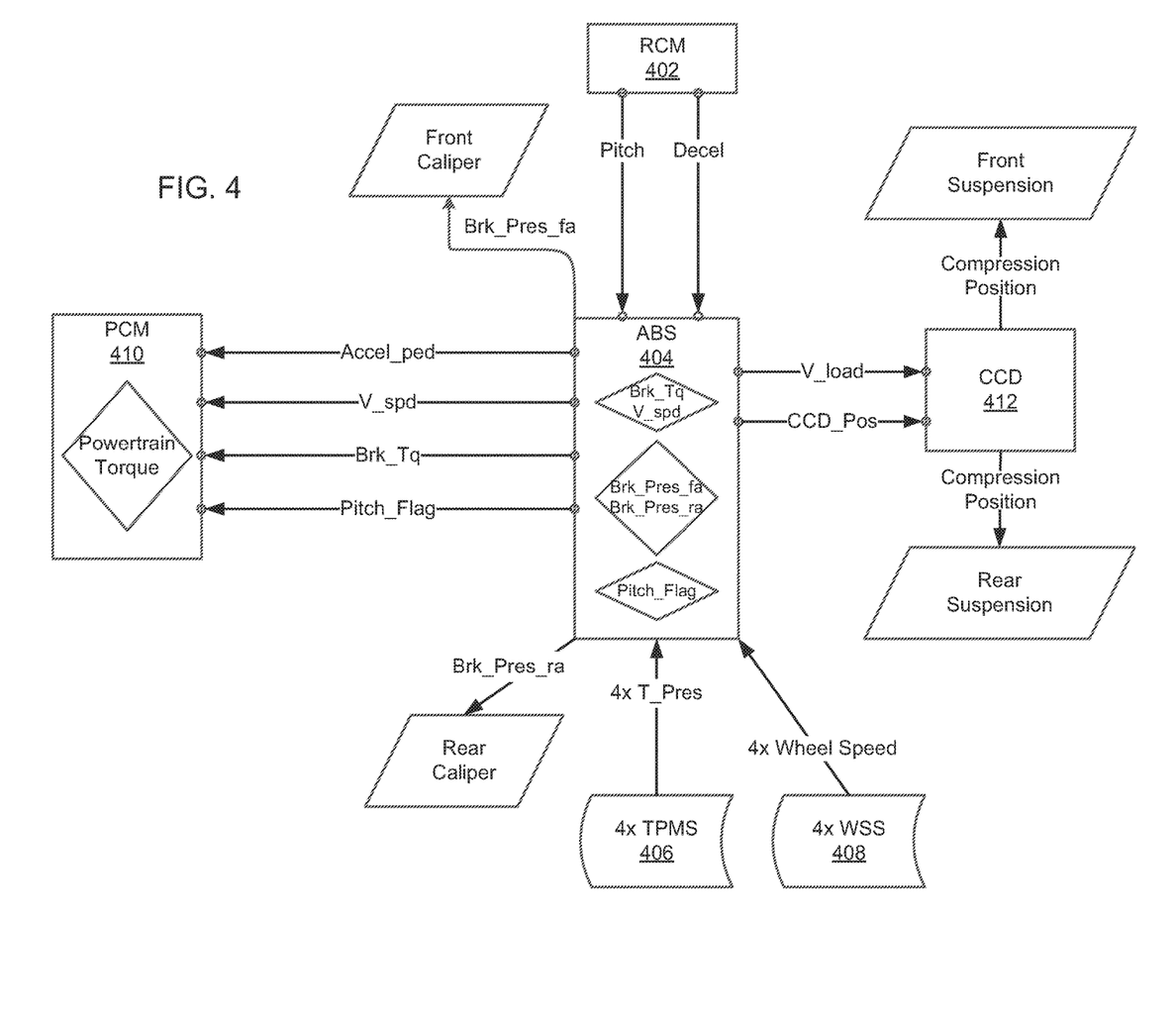
FIG. 4 is a schematic block diagram illustrating communication between components of an electronic control unit (ECU) of a vehicle, according to one embodiment.

FIG. 4 is a schematic block diagram illustrating communication between components of an electronic control unit (ECU) of a vehicle. For example, the ECU may be included as part of the control system 100 or pitch control component 104 of FIG. 1. A restrain control module (RCM) 402 determines a pitch (vehicle pitch angle) and decel (vehicle deceleration rate) and provides them to an antilock brake system (ABS) 404. The ABS 404 also receives tire pressures (T_Pres) for each tire from a tire pressure monitor system 406 and wheel speeds (4× wheel speed) from wheel speed sensors (WSS) 408. Based on the inputs, the ABS 404 determines a brake torque (Brk_tq), vehicle speed (V_spd), brake pressure for front axle (Brk_Pres_fa), brake pressure for the rear axle (Brk_Pres_ra), and a pitch flag (Pitch_Flag). The pitch flag may indicate whether the vehicle pitch exceeds or falls below a pitch threshold.

The ABS 404 outputs the brake pressure for front axle (Brk_Pres_fa) to one or more front brake calipers (or front brakes) and outputs brake pressure for the rear axle (Brk_Pres_ra) to a rear caliper (or rear brakes). In one embodiment, when the ABS 404 applies brake pressure to non-driven wheels, reverse torque is applied to driven wheels, thus reducing rebound rate after stop and thereby mitigating head bob or end of stop grab. The ABS 404 outputs the position of the accelerator pedal (Accel_ped), the vehicle speed (V_spd), the brake torque (Brk_Tq), and pitch flag (Pitch_Flag) to the powertrain control module (PCM) 410. Based on this data, the PCM 410 generates powertrain torque to apply to the drive wheels. In one embodiment, the PCM 410 generates reverse torque to reduce front suspension rebound after braking to a stop. The ABS 404 also outputs a vehicle load (V_load) and a continuously controlled damping position (CCD_Pos) to a continuously controlled damping (CCD) module 412. The CCD module 412 outputs a compression position to front and rear suspension to control damping and compression.

Figure 5:
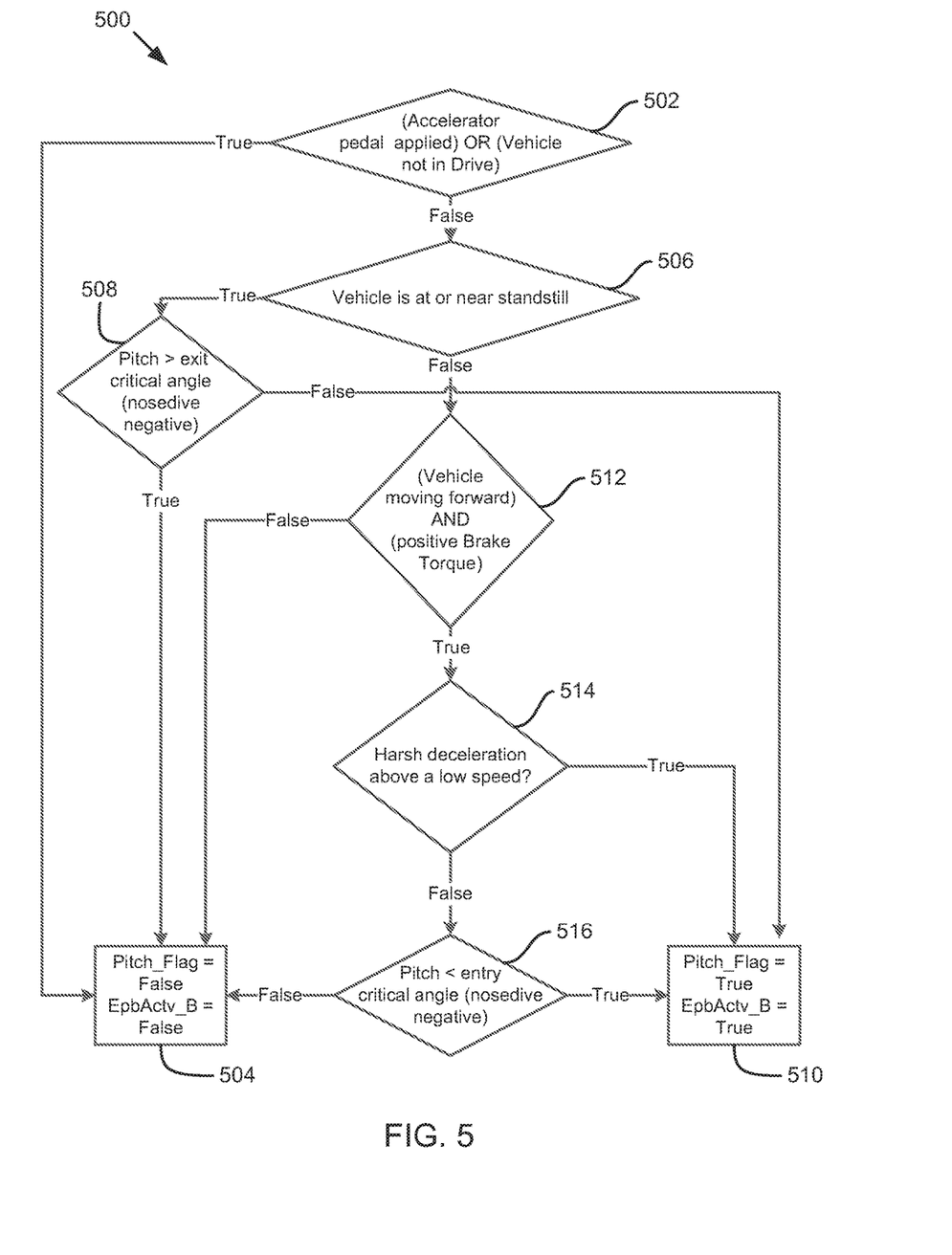
FIG. 5 is a schematic flow chart diagram illustrating a method for setting a pitch flag of a vehicle based on current driving parameters of a vehicle, according to one embodiment.

FIG. 5 is a schematic flow chart diagram illustrating a method 500 for setting a pitch flag (e.g., Pitch_Flag of FIG. 4) of a vehicle based on current driving parameters of a vehicle. The method 500 may be performed by an ECU, ABS system, or pitch control component 104 or other component of a control system 100. The method 500 includes determining 502 whether the accelerator pedal is being pressed or the vehicle is in drive. If the accelerator pedal is being pressed or the vehicle is in drive (True at 502) a pitch flag is set to false and/or a parking brake status is set to false (EpbActv_B) at 504. If the accelerator pedal is being pressed and the vehicle is not in drive (False at 502), the method includes determining 506 whether the vehicle is at or near a standstill. For example, the pitch control component 104 may determine whether the vehicle velocity is below a threshold.

If the vehicle is at or near a standstill (True at 506), the method includes checking 508 whether the vehicle pitch is below an exit critical angle. The exit critical angle may include an angle at which greater rebound may begin to be uncomfortable. Because a nose dive or forward pitch may constitute a negative angle, the pitch may need to fall below (e.g., be more negative) than the exit critical angle to trigger rebound mitigation. If the pitch is greater (e.g., less negative) than the critical angle (True at 508) a pitch flag is set to false and/or a parking brake status is set to false (EpbActv_B) at 504. If the pitch is less (e.g., more negative) than the critical angle (False at 508) a pitch flag is set to true and/or a parking brake status is set to true (EpbActv_B) at 510. (A true pitch flag and/or true parking brake status may trigger a reverse torque procedure to mitigate rebound.)

If the vehicle is not at or near a standstill (False at 506), the method includes determining 512 whether the vehicle is moving forward and there is positive brake torque (e.g., a brake is slowing the vehicle). If the vehicle is not moving forward and there is not positive brake torque (False at 512), a pitch flag is set to false and/or a parking brake status is set to false (EpbActv_B) at 504. If the vehicle is moving forward and there is positive brake torque (True at 512), the method includes determining 514 whether there is harsh deceleration above a low speed. For example, harsh deceleration may include the deceleration falling above a threshold deceleration rate and a low speed may include a threshold speed. If there is harsh deceleration above a low speed (True at 514), a pitch flag is set to true and/or a parking brake status is set to true (EpbActv_B) at 510. If there is not harsh deceleration above a low speed (False at 514), the method 500 includes determining 516 whether the vehicle pitch is less than an entry critical angle. The entry critical angle may include an angle at which rebound may begin to be unnoticeable or otherwise acceptable. If the pitch is not less than (e.g., less negative) than the entry critical angle (False at 516) a pitch flag is set to false and/or a parking brake status is set to false (EpbActv_B) at 504. If the pitch is less (e.g., more negative) than the entry critical angle (True at 516) a pitch flag is set to true and/or a parking brake status is set to true (EpbActv_B) at 510.

The method 500 may be periodically performed (e.g., by a pitch control component 510 or ABS 404) to update the status of a pitch flag and/or a parking brake state. This pitch flag may be used to determine whether a reverse torque and braking feature should be used to mitigate end of stop grab. If the pitch flag is false, the reverse torque and braking feature may be deactivated.

In one embodiment, Equation 1 below may be used to estimate the pitch angle of a vehicle based on the displacement/compression of a front suspension from equilibrium (e.g., resting compression).

$$\phi = \arctan\left(\frac{d}{x}\right) \quad \text{Equation 1}$$

The parameters of Equation 1 represent the following: φ is the pitch of the vehicle, which would be negative when the front end of the vehicle is tilted downward; x is the distance between the front suspension or front axle and the center of gravity of the vehicle; and d is the amount of displacement (in distance) of the front suspension. A system may solve for φ to estimate the current pitch of a vehicle. Vehicle pitch angle may also be computed directly based on pitch sensors or even vehicle speed and vehicle deceleration.

In one embodiment, Equation 2 below may be used to estimate the amount of torque needed to match a displacement/compression of a front suspension from equilibrium (e.g., resting compression).

$$T_{pt} = \frac{r \cdot k \cdot x \cdot d}{y} \quad \text{Equation 2}$$

The parameters of Equation 2 represent the following: r is a radius of a vehicle wheel; y is the height of the center of gravity of the vehicle (e.g., from a level ground surface); x is the distance between the front suspension or front axle and the center of gravity of the vehicle (for front-wheel drive vehicle); d is the amount of displacement (in distance) of the front suspension; and k is a compression constant for the front suspension (e.g., front springs). It should be noted that r·k·x/y may be a constant that can be computed and stored as a parameter for a given vehicle or vehicle model. A system may solve for $T_{pt}$ to determine how much torque it will take to match a current displacement of the estimate the current pitch of a vehicle. For example, the computed torque may be used to prevent rebound and the computed torque may be slowly ramped out to smoothly allow the vehicle to return to an equilibrium state without causing uncomfortable end-of-stop grab or head bob.

The following Matlab® pseudo code is illustrative of one implementation for calculating a vehicle pitch based on suspension deflection.

```
function [ParkBrake_engage, Pitch_flag] = pitchcontrol(Pedal_accel, ...
    V_spd, V_accel, Brk_Tq, GearLvr_Pos, Pitch)
%% These are thresholds used for triggering the algorithm.
% These are acceleration, pitch, and velocity thresholds.
LongAccThresh = -0.5; %(m/52) example value
CritEntryPitch = -25; %(deg) example value
CritExitPitch = -10; %(deg) Hysteresis between Entry & Exit Critical
Pitch
ActVelThresh = 10; %(kph) example value
ApedThres = 2; % example value. Pedal threshold could be less.
If ((Pedal accel > ApedThres) | (GearLvr_Pos ~= 3))
    % exit out, if accelerator pedal pressed
    %exit out, if GearLvr_Pos <> DRIVE (0x03)
    Pitch_flag = false;
    ParkBrake_engage = false;
ElseIf (V_spd == 0)
    % check if the speed calculated by the ABS module
    % based off the wheel speed inputs has reached zero.
    If (Pitch < CritExitPitch)
        % negative pitch exceeds critical value
        Pitch_flag = true;
        ParkBrake_engage = true;
    Else
        Pitch_flag = false;
        ParkBrake_engage = false;
    End
ElseIf ((V_spd > 0) & (Brk_Tq > 0))
    If ((V_accel < LongAccThresh) & (V_spd > ActVelThresh))
        % check for harsh braking condition and anticipate
        Pitch_flag = true;
        ParkBrake_engage = true;
    ElseIf (Pitch >= CritEntryPitch)
        % see when critical pitch reached (forward hold)
        Pitch_flag = true;
        ParkBrake_engage = true;
    Else
        Pitch_flag = false;
        ParkBrake_engage = false;
    End
End
```

The following parameters may be passed as global controller area network (CAN) signals. However, the pseudo code above is showing them as passed values. Pedal_accel=accelerator pedal percent depressed; we monitor this and cancel pitch control if greater than threshold value. V_spd=vehicle speed; we monitor when it hits zero. V_accel=compensated (filtered) long deceleration signal used to determine windup of transmission. Brk_Tq=requested brake torque, check if brake torque applied. GearLvr_Pos=position of PRNDL. For the pitch parameter, the above pseudo code assumes a RCM 402, a front control interface module (FCIM), or an ABS 404 has a pitch angle sensor and sensor is compensated (filtered).

The following Matlab® code represents one implementation for calculating a vehicle pitch based on suspension deflection. For example, the calculated vehicle pitch may be calculated if actual pitch measurements are not available or may be use to filter or supplement other vehicle pitch determinations to obtain a more accurate vehicle pitch.

```
A = EXIST(Pitch);
if (A == 0)
   Susp_X_CG = X_CenterGravity - FrontWheel_X_Axis;
   Susp_Y_CG = Y_CenterGravity - FrontWheel_Y_Axis;
   SuspensionDeflection = V_accel * VehicleMass ...
      * Susp_Y_CG / Susp_X_CG / SuspensionSpringConstant;
   Pitch = arctan( SuspensionDeflection / Susp_X_CG);
end
(ParkBrake_engage, Pitch_flag) = pitchcontrol(Pedal_accel, ...
       V_spd, V_accel, Brk_Tq, GearLyr_Pos, Pitch);
if Pitch_Flag == true
   %request powertrain to wind up negative torque based on pitch angle.
   %Assume powertrain calibration is established by powertrain group.
   powertrainNegativeTorque(VehPitchComp_A_Actl, V_accel);
      if ParkBrake_engage
         % Command the park brake to engage
         engageParkBrake( );
         % Park brake will release once driver presses the accelerator pedal
      end
end
```

There is a moment creating a negative pitch based on force acting on front and rear axles multiplied by distance to vehicle center of gravity (e.g., Y direction or perpendicular to ground). This axle force is from vehicle deceleration times vehicle mass. There is a resisting moment created by the suspension force resisting the negative pitch multiplied by distance to vehicle center of gravity (e.g., X direction or parallel to ground). This suspension force=spring constant× deflection. When M1=M2, then equilibrium is reached. This suspension deflection defines the pitch angle. Tan(Pitch Angle)=suspension Y deflection/suspension X distance to center of gravity.

Figure 6:
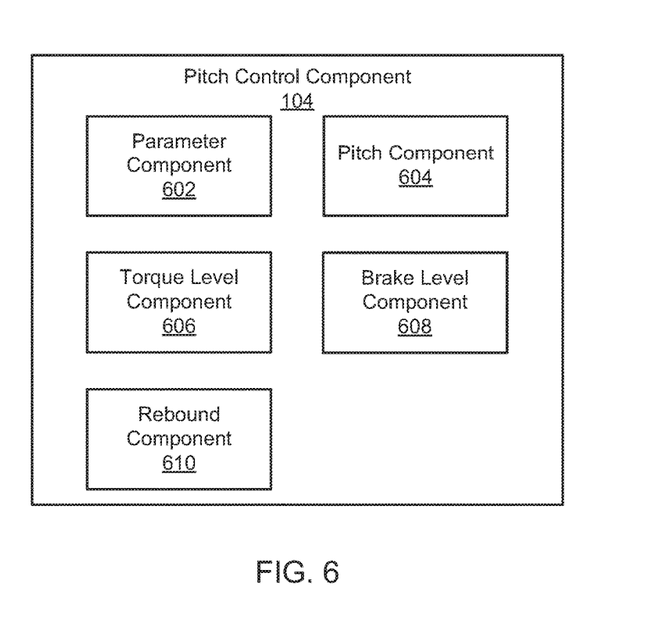
FIG. 6 is a schematic block diagram illustrating example components of pitch control component, according to one implementation.

Turning to FIG. 6, a schematic block diagram illustrating components of a pitch control component 104, according to one embodiment, is shown. The pitch control component 104 includes a parameter component 602, a pitch component 604, a torque level component 606, a brake level component 608, and a rebound component 610. The components 602-610 are given by way of illustration only and may not all be included in all embodiments. In fact, some embodiments may include only one or any combination of two or more of the components 602-610 For example, some of the components 602-610 may be located outside the pitch control component 104, such as within the automated driving/assistance system 102, an ECU (such as an RCM 402, ABS 404, PCM 410, or CCD module 412), or elsewhere.

The parameter component 602 is configured to determine parameters for the vehicle. The parameters may include information about vehicle travel, driver input, a driving environment, vehicle model or performance information, or any other parameters. In one embodiment, the parameter component 602 may receive the parameters from sensors or controllers of a vehicle. In one embodiment, the parameter component 602 may receive or compute parameters that include a vehicle pitch angle, a roadway slope, a vehicle model, a current suspension damping rate, or the like.

The pitch component 604 is configured to determine a current pitch angle for a vehicle. For example, the pitch component 604 may determine the pitch angle based on pitch sensors of the vehicle. As another embodiment, the pitch component 604 determines a pitch angle based on suspension displacement. For example, the pitch component may determine the pitch angle based on a compression of a rear and/or front suspension of a vehicle. The pitch angle may be computed based on shock or suspension displacement as indicated in Equation 1. In one embodiment, the pitch component 604 determines a vehicle pitch angle based on a change in tire pressure. For example, an increase in pressure in the front tires and/or a reduction in pressure in the rear tires may indicate that the vehicle is pitching forward. In one embodiment, the pitch component 604 determines a pitch angle based on a vehicle deceleration rate.

In one embodiment, the pitch component 604 is configured to determine whether an absolute value of a pitch angle exceeds a pitch threshold. For example, the pitch component 604 may determine a pitch angle for a vehicle and determine whether the absolute value of the pitch angle is greater, equal to, or less than the threshold. In one embodiment, the pitch component 604 may determine whether the pitch angle is greater than a negative pitch (e.g., a forward pitch may have a negative pitch angle). In one embodiment, if the pitch angle is less than the pitch threshold (e.g., more negative), the pitch component 604 may determine that the pitch angle exceeds the pitch threshold.

The torque level component 606 is configured to determine a reverse torque level to apply to drive wheels. For example, the torque level component 606 may determine a reverse torque level based on the amount of torque it would take to cause a current pitch of the vehicle. The torque level component 606 may also calculate a reverse torque level to slightly reduce the pitch so that the pitch angle of a vehicle can be slowly reduced to zero pitch, or equilibrium.

The brake level component 608 is configured to determine a brake pressure level to apply to non-drive wheels. For example, the brake level component 608 may determine whether to apply a brake to maintain a vehicle in place during application of reverse torque. In one embodiment, the brake level component 608 may determine whether to actuate an emergency brake (which may include a parking brake), service brake, or other brake even though a user has not provided pedal or other input to activate the brake.

The rebound component 610 is configured to apply brake pressure and/or reverse torque based on parameters, pitch angle, brake level, and/or reverse torque level as determined by the other components 602-608. In one embodiment, the rebound component 610 causes the brake level or torque level to be applied by providing an instructions to a braking module (e.g., ABS 404) or powertrain module (e.g., PCM 410). In one embodiment, the rebound component 610 causes the rebound mitigation to be performed in response to the vehicle achieving a substantially zero forward velocity and having a pitch exceeding (or falling below) a pitch threshold.

In one embodiment, the rebound component 610 applies brake and torque control based using feedback control based on the vehicle pitch. For example, the rebound component 610 may apply a reverse torque and based on how the vehicle pitch changes over time repeatedly update the amount of torque applied to slowly reduce (or increase) the pitch and bring the vehicle to a level or equilibrium state. In one embodiment, the rebound component 610 periodically cause the pitch control component 104 to repeatedly determine parameters, determine the brake pressure level, determine the reverse torque level, apply the brake pressure level, and apply the reverse torque level to maintain the suspension rebound rate below a threshold rebound rate. The threshold rebound rate may include a rate of change for suspension to rebound. For example, the rebound rate may include a rate of rebound that may be comfortable or unnoticeable to passengers. In one embodiment, the rebound component 610 is configured to apply brake pressure or apply reverse torque by increasing or decreasing brake or reverse torque based on a vehicle pitch angle. The feedback control of the pitch allows the vehicle pitch to be controlled dynamically as conditions change and allows for a smooth stop without reducing braking distance.

Figure 7:
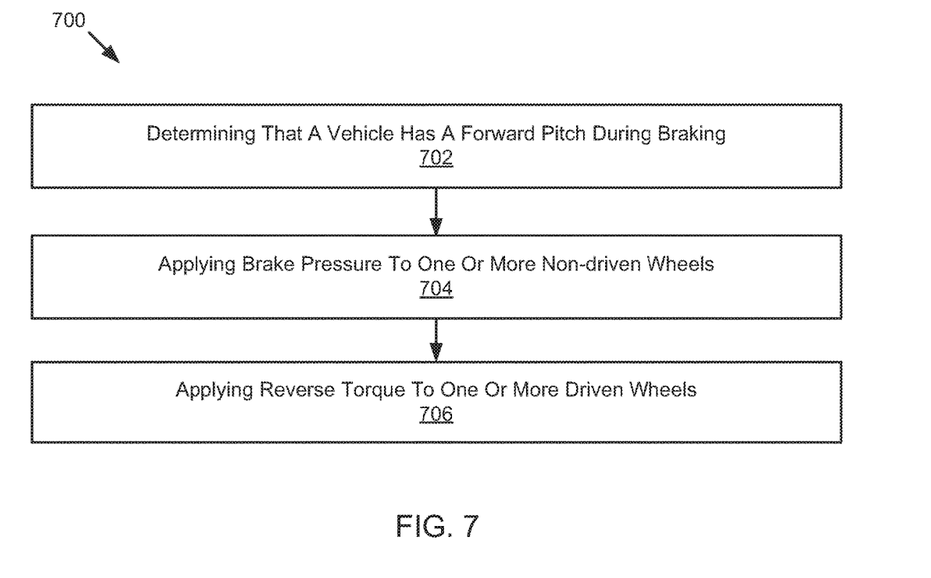
FIG. 7 is a schematic block diagram illustrating a method for reducing a suspension rebound rate when stopping a vehicle, according to one implementation.

FIG. 7 is a schematic flow chart diagram illustrating a method 700 for reducing a suspension rebound rate when stopping a vehicle. The method 700 may be performed by an ECU, pitch control component, or control system, such as the ECU of FIG. 4, pitch control component 104 of FIG. 1 or 6, or the control system 100 of FIG. 1.

The method 700 begins and a pitch component 604 determines 702 that a vehicle has a forward pitch during braking. A rebound component 610 applies 704 braking pressure to one or more non-driven wheels. The rebound component 610 may apply 704 a brake pressure level as determined by a brake level component 608 by sending instructions to an ABS 404 system or directly to brake calipers or a brake controller. The rebound component 610 applies 704 reverse torque to one or more driven wheels. The rebound component 610 may apply 706 a reverse torque level as determined by a torque level component 606 by sending instructions to powertrain controller, such as a PCM 410, to apply the torque level. The rebound component 610 may apply 704 the brake pressure and apply 706 the reverse torque in response to the vehicle achieving an approximately zero forward velocity.

Figure 8:
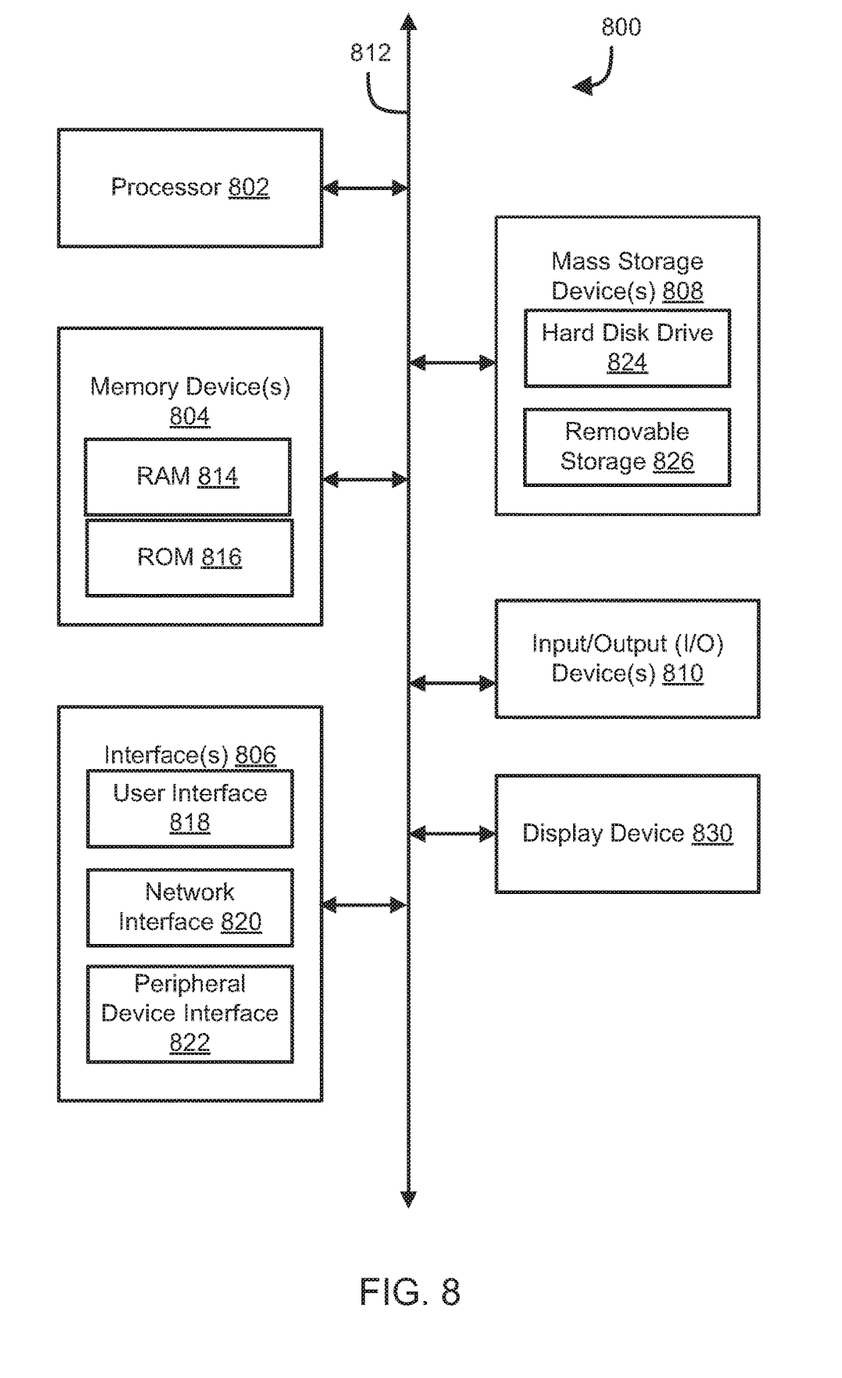
FIG. 8 is a schematic block diagram illustrating a computing system, according to one implementation.

Referring now to FIG. 8, a block diagram of an example computing device 800 is illustrated. Computing device 800 may be used to perform various procedures, such as those discussed herein. Computing device 800 can function as a pitch control component 104, automated driving/assistance system 102, ECU, RCM 402, ABS 404, PCM 410, CCD 412, or any other computing entity. Computing device 800 can perform various monitoring functions as discussed herein, and can execute one or more application programs, such as the application programs or functionality described herein. Computing device 800 can be any of a wide variety of computing devices, such as a desktop computer, in-dash computer, vehicle control system, a notebook computer, a server computer, a handheld computer, tablet computer and the like.

Computing device 800 includes one or more processor(s) 802, one or more memory device(s) 804, one or more interface(s) 806, one or more mass storage device(s) 808, one or more Input/Output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 may include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, or any suitable user interface now known to those of ordinary skill in the field, or later discovered), keyboards, and the like.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for reducing a suspension rebound rate when stopping a vehicle. The method includes determining that a vehicle has a forward pitch during braking. The method also includes applying brake pressure to one or more non-driven wheels and applying reverse torque to one or more driven wheels. Applying brake pressure and reverse torque is performed in response to the vehicle achieving an approximately zero forward velocity.

In Example 2, a method as in Example 1 further includes reducing the reverse torque to allow the vehicle to return to a zero pitch angle position.

In Example 3, a method as in any of Examples 1-2 further includes determining parameters comprising one or more of a vehicle pitch angle, a roadway slope, a vehicle model, or a current suspension damping rate. The method also includes determining a brake pressure level based on the parameters and determining a reverse torque level based on the parameters. Applying brake pressure includes applying the brake pressure level and applying the reverse torque includes applying the reverse torque level.

In Example 4, a method as in Example 3 further includes periodically repeating one or more of determining the parameters, determining the brake pressure level, determining the reverse torque level, applying the brake pressure level, and applying the reverse torque level to maintain the suspension rebound rate below a threshold rebound rate.

In Example 5, applying apply brake pressure to the non-driven wheels as in any of Examples 1-4 includes applying brake pressure using one or more of an emergency brake or a service brake.

In Example 6, determining that a vehicle has the forward pitch as in any of Examples 1-5 includes determining a vehicle pitch angle based on a change in tire pressure.

In Example 8, determining that a vehicle has the forward pitch as in any of Examples 1-6 includes determining a vehicle pitch angle based on a vehicle deceleration rate.

In Example 8, applying brake pressure and applying reverse torque as in any of Examples 1-8 includes increasing or decreasing brake or reverse torque based on a vehicle pitch angle.

Example 9 is a system that includes a pitch component and a rebound component. The pitch component is configured to determine that a vehicle has a forward pitch during braking. The rebound component configured to, in response to the vehicle achieving a substantially zero forward velocity apply brake pressure to one or more non-driven wheels using one or more brakes and apply reverse torque to one or more driven wheels using a motor or engine.

In Example 10, the rebound component as in Example 9 is further configured to reduce the reverse torque to allow the vehicle to return to a zero pitch position.

In Example 11, a system as in any of Examples 9-10 further includes a parameter component, a brake level component, and a torque component. The parameter component is configured to determine parameters comprising one or more of a vehicle pitch angle, a roadway slope, a vehicle model, or a current suspension damping rate. The brake level component is configured to determine a brake pressure level based on the parameters. The torque component is configured to determine a reverse torque level based on the parameters. The rebound component is configured to apply brake pressure by applying the brake pressure level and apply the reverse torque by applying the reverse torque level.

In Example 12, a rebound component as in Example 11 is configured to cause the system to periodically repeat one or more of determining the parameters, determining the brake pressure level, determining the reverse torque level, applying the brake pressure level, and applying the reverse torque level to maintain the suspension rebound rate below a threshold rebound rate.

In Example 13, one or more brakes as in any of Examples 9-12 include one or more of an emergency brake or a service brake.

In Example 14, a pitch component as in any of Examples 9-13 is configured to determine that the vehicle has the forward pitch by determining a vehicle pitch angle based on a change in tire pressure.

In Example 15, a pitch component as in any of Examples 9-14 is configured to determine that the vehicle has the forward pitch by determining a vehicle pitch angle based on a vehicle deceleration rate.

In Example 16, a rebound component as in any of Examples 9-15 is configured to apply brake pressure or apply reverse torque by increasing or decreasing brake or reverse torque based on a vehicle pitch angle.

Example 17 is a computer readable storage media storing instructions that, when executed by one or more processors, cause the one or more processors to determine that a vehicle has a forward pitch during braking. The instructions cause the one or more processors to, in response to the vehicle achieving a substantially zero forward velocity, apply rake pressure to one or more non-driven wheels and apply reverse torque to one or more driven wheels.

In Example 18, a computer readable storage media as in Example 17 further includes instructions that cause the one or more processors reduce the reverse torque to allow the vehicle to return to a zero pitch position.

In Example 19, a computer readable storage media as in any of Examples 1-18 further includes instructions that cause the one or more processors to: determine parameters comprising one or more of a vehicle pitch angle, a roadway slope, a vehicle model, or a current suspension damping rate; determine a brake pressure level based on the parameters; and determine a reverse torque level based on the parameters. The instructions cause the one or more processors to apply brake pressure by applying the brake pressure level and to apply the reverse torque by applying the reverse torque level.

In Example 20, a computer readable storage media as in Example 19 further includes instructions that cause the one or more processors to periodically repeat one or more of determining the parameters, determining the brake pressure level, determining the reverse torque level, applying the brake pressure level, and applying the reverse torque level to maintain the suspension rebound rate below a threshold rebound rate.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for reducing a suspension rebound rate when stopping a vehicle, the method comprising:
   determining, by a processor, that a vehicle has a forward pitch during braking; and
   in response to the vehicle achieving an approximately zero forward velocity,
      applying brake pressure to one or more non-driven wheels by an automated driving assistance system, and
      applying reverse torque to one or more driven wheels by the automated driving assistance system.

2. The method of claim 1, further comprising reducing the reverse torque to allow the vehicle to return to a zero pitch angle position.

3. The method of claim 1, further comprising:
   determining parameters comprising one or more of a vehicle pitch angle, a roadway slope, a vehicle model, or a current suspension damping rate;
   determining a brake pressure level based on the parameters; and determining a reverse torque level based on the parameters;

wherein applying brake pressure comprises applying the brake pressure level and applying the reverse torque comprises applying the reverse torque level.

4. The method of claim 3, further comprising periodically repeating one or more of determining the parameters, determining the brake pressure level, determining the reverse torque level, applying the brake pressure level, and applying the reverse torque level to maintain the suspension rebound rate below a threshold rebound rate.

5. The method of claim 1, wherein applying apply brake pressure to the non-driven wheels comprises applying brake pressure using one or more of an emergency brake or a service brake.

6. The method of claim 1, wherein determining that a vehicle has the forward pitch comprises determining a vehicle pitch angle based on a change in tire pressure.

7. The method of claim 1, wherein determining that a vehicle has the forward pitch comprises determining a vehicle pitch angle based on a vehicle deceleration rate.

8. The method of claim 1, wherein applying brake pressure and applying reverse torque comprises increasing or decreasing brake or reverse torque based on a vehicle pitch angle.

9. A system comprising:
a pitch component configured to determine that a vehicle has a forward pitch during braking;
a rebound component configured to, in response to the vehicle achieving a substantially zero forward velocity:
apply brake pressure to one or more non-driven wheels using one or more brakes; and
apply reverse torque to one or more driven wheels using a motor or engine.

10. The system of claim 9, wherein the rebound component is further configured to reduce the reverse torque to allow the vehicle to return to a zero pitch position.

11. The system of claim 9, wherein the system further comprises:
a parameter component configured to determine parameters comprising one or more of a vehicle pitch angle, a roadway slope, a vehicle model, or a current suspension damping rate;
a brake level component configured to determine a brake pressure level based on the parameters; and
a torque level component configured to determine a reverse torque level based on the parameters;
wherein the rebound component is configured to apply brake pressure by applying the brake pressure level and apply the reverse torque by applying the reverse torque level.

12. The system of claim 11, wherein the rebound component is configured to cause the system to periodically repeat one or more of determining the parameters, determining the brake pressure level, determining the reverse torque level, applying the brake pressure level, and applying the reverse torque level to maintain the suspension rebound rate below a threshold rebound rate.

13. The system of claim 9, wherein the one or more brakes comprises one or more of an emergency brake or a service brake.

14. The system of claim 9, wherein the pitch component is configured to determine that the vehicle has the forward pitch by determining a vehicle pitch angle based on a change in tire pressure.

15. The system of claim 9, wherein the pitch component is configured to determine that the vehicle has the forward pitch by determining a vehicle pitch angle based on a vehicle deceleration rate.

16. The system of claim 9, wherein the rebound component is configured to apply brake pressure or apply reverse torque by increasing or decreasing brake or reverse torque based on a vehicle pitch angle.

17. Non-transitory computer readable storage media storing instructions that, when executed by one or more processors, cause the one or more processors to:
determine that a vehicle has a forward pitch during braking; and
in response to the vehicle achieving a substantially zero forward velocity,
apply brake pressure to one or more non-driven wheels, and
apply reverse torque to one or more driven wheels.

18. The non-transitory computer readable storage media of claim 17, further comprising instructions that cause the one or more processors reduce the reverse torque to allow the vehicle to return to a zero pitch position.

19. The non-transitory computer readable storage media of claim 18, further comprising instructions that cause the one or more processors to:
determine parameters comprising one or more of a vehicle pitch angle, a roadway slope, a vehicle model, or a current suspension damping rate;
determine a brake pressure level based on the parameters; and
determine a reverse torque level based on the parameters;
wherein the instructions cause the one or more processors to apply brake pressure by applying the brake pressure level and to apply the reverse torque by applying the reverse torque level.

20. The non-transitory computer readable storage media of claim 19, further comprising instructions that cause the one or more processors to periodically repeat one or more of determining the parameters, determining the brake pressure level, determining the reverse torque level, applying the brake pressure level, and applying the reverse torque level to maintain the suspension rebound rate below a threshold rebound rate.

* * * * *